(12) United States Patent
Hashizume

(10) Patent No.: US 8,562,150 B2
(45) Date of Patent: Oct. 22, 2013

(54) OPTICAL AXIS ADJUSTMENT DEVICE, METHOD FOR ADJUSTING OPTICAL AXIS AND PROJECTION-TYPE DISPLAY APPARATUS

(75) Inventor: Jiro Hashizume, Toride (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 13/201,676

(22) PCT Filed: Feb. 24, 2010

(86) PCT No.: PCT/JP2010/052895
§ 371 (c)(1),
(2), (4) Date: Aug. 16, 2011

(87) PCT Pub. No.: WO2010/098363
PCT Pub. Date: Sep. 2, 2010

(65) Prior Publication Data
US 2011/0304832 A1    Dec. 15, 2011

(30) Foreign Application Priority Data

Feb. 26, 2009  (JP) .................................. 2009-044560

(51) Int. Cl.
| G03B 21/28 | (2006.01) |
| G02B 26/08 | (2006.01) |
| G01C 1/00 | (2006.01) |
| G01B 11/14 | (2006.01) |
| H01S 5/00 | (2006.01) |

(52) U.S. Cl.
USPC ......... 353/85; 353/94; 359/204.2; 356/139.1; 356/622; 356/222; 372/50.21; 362/284; 362/324

(58) Field of Classification Search
USPC ......... 353/85, 94; 359/204.2; 356/139.1, 622, 356/222, 138; 372/50.21; 362/284, 324, 362/271
See application file for complete search history.

(56) References Cited

U.S. PATENT DOCUMENTS

| 6,768,562 B1* | 7/2004 | Takada et al. ................. 358/296 |
| 2007/0120983 A1* | 5/2007 | Yamamoto et al. ...... 348/208.99 |
| 2011/0096383 A1* | 4/2011 | Nomoto et al. ............ 359/204.2 |

FOREIGN PATENT DOCUMENTS

| JP | 06-075191 | 3/1994 |
| JP | 6-75191 | 3/1994 |
| JP | 9-159874 | 6/1997 |
| JP | 09-159874 | 6/1997 |
| JP | 2001-4940 | 1/2001 |
| JP | 2007-121539 | 5/2007 |
| JP | 2007-156056 | 6/2007 |
| WO | WO 2005/083507 A1 | 9/2005 |
| WO | WO 2009/154134 A1 | 12/2009 |

* cited by examiner

*Primary Examiner* — Georgia Y Epps
*Assistant Examiner* — Magda Cruz
(74) *Attorney, Agent, or Firm* — Antonelli, Terry, Stout & Kraus, LLP.

(57) ABSTRACT

A projection type display apparatus in which an inclination and a positional deviation of optical axes among a plurality of light sources can be easily corrected to obtain a high quality projection image. Green, blue and red laser beams emitted from light sources are converted into collimated beams by condenser lenses, and the positions and angles of the optical axes of the beams of the three colors are evaluated by position detection imaging device and angle detection imaging device, respectively. The positions and angles of the light sources are adjusted by respective actuators so that the positions and angles of the optical axes match each other. Consequently, the laser beams emitted from the light sources can be combined with high accuracy to thereby realize a high definition projection type display apparatus.

13 Claims, 12 Drawing Sheets

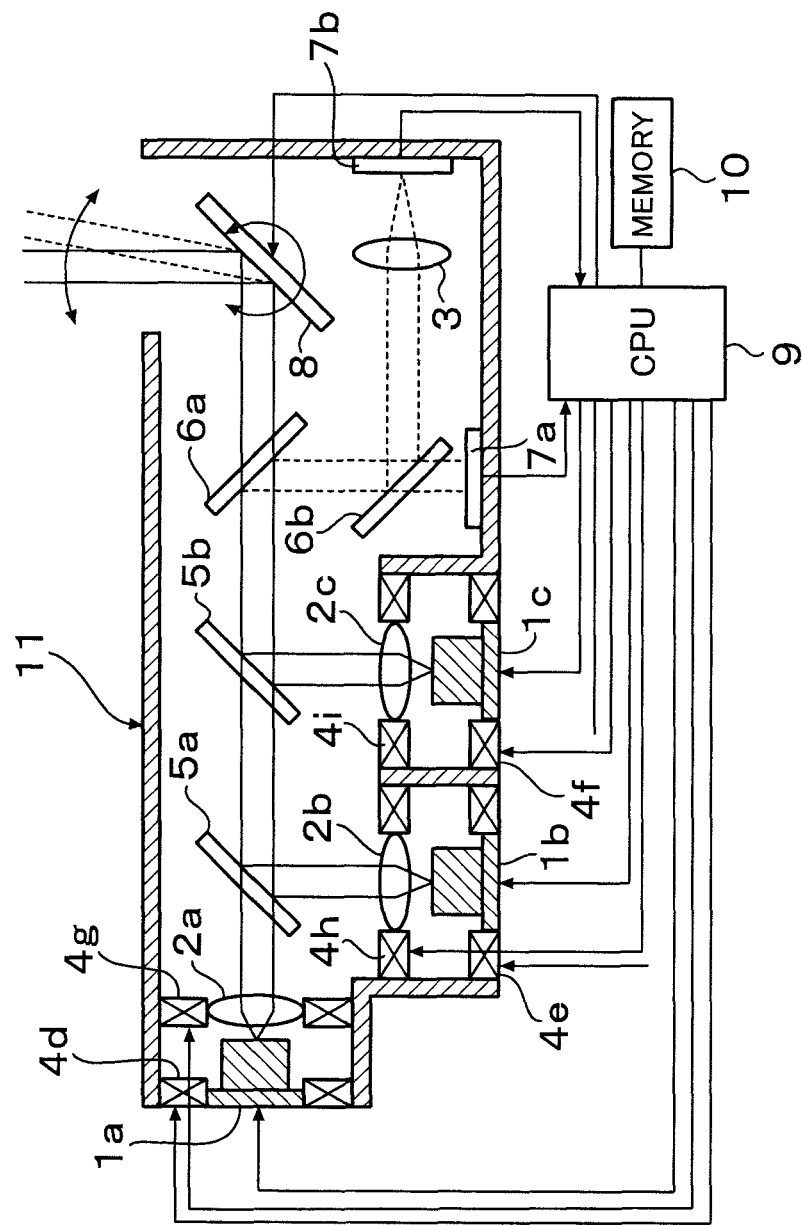
FIG. 4
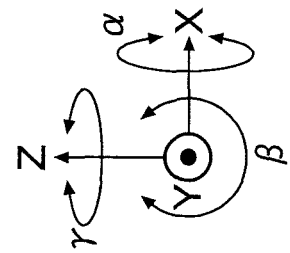

FIG. 6
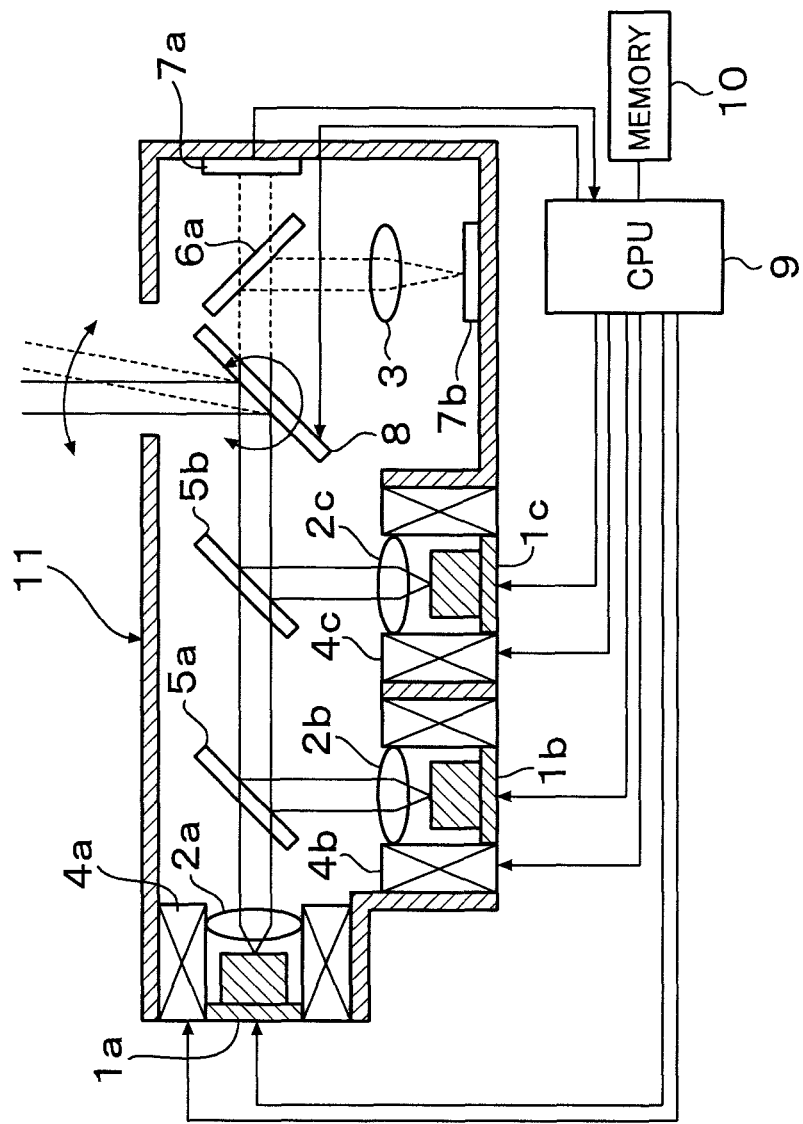
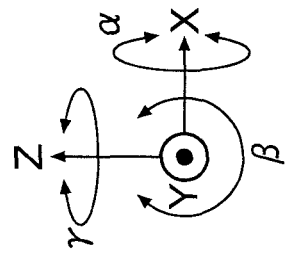

OPTICAL AXIS ADJUSTMENT DEVICE, METHOD FOR ADJUSTING OPTICAL AXIS AND PROJECTION-TYPE DISPLAY APPARATUS

TECHNICAL FIELD

The present invention relates to an optical axis adjustment device, a method for adjusting an optical axis and a projection-type display apparatus, and more particularly to an optical axis adjustment device that highly accurately aligns optical axes of multiple laser beams or other kinds of light used in a laser projection-type display apparatus or other types of display apparatus, a method for adjusting the optical axes and a projection-type display apparatus using the device and the method.

BACKGROUND ART

With development of small green lasers and blue semiconductor lasers using wavelength conversion elements in recent years, ultra compact projectors employing lasers as light sources have been proposed. Such a projector with laser light sources can demonstrate good color reproducibility and reduce the power requirement in a smaller package, and is implementable as a scanning-type image display apparatus that has various advantages; for example, it does not require affixed pixels and therefore can easily change the resolution.

For example, an ultra compact projector with laser light sources modulates the light sources for laser beams of three colors, i.e., red, green and blue, directly or indirectly through an external modulator, converts the laser beams into collimated light beams by collimation lenses, combines the laser beams into a light beam, and two-dimensionally moves the light beam on a screen using, for example, a MEMS mirror to project it as an image. In order to combine the laser beams of three colors, red, green and blue, on a single optical axis, dichroic mirrors are used as a well-known technique.

The technique of combining the red, green and blue laser beams on an optical axis with dichroic mirrors is disclosed, for example, in Patent Literature 1.

The projection-type display apparatus that combines red, green and blue laser beams into a single light beam and projects the light beam on an image-projected surface of a screen by using the combining technique disclosed in Patent Literature 1 needs to project the laser beams of respective colors to fill the same pixels on the image-projected surface to combine the red, green and blue laser beams into a single beam and project it onto the image-projected surface, which requires highly accurate adjustment of the optical axes of the laser beams of the respective colors. A conventional technique of adjusting the optical axes of the respective colors is known as, for example, Patent Literature 2. The technique disclosed in Patent Literature 2 is to reflect the respective laser beams with separate MEMS mirrors to perform a two-dimensional scan and provides a correction mechanism to each of the MEMS mirrors to correct an initial angle deviation.

CITATION LIST

Patent Literature

PTL 1: JP-A No. 2007-121539
PTL 2: JP-A No. 2007-156056

SUMMARY OF INVENTION

Technical Problems

In the projection-type display apparatus to which the technique disclosed in Patent Literature 2 is applied, adjustment of the deviation of the laser beams caused by the MEMS mirrors is made by an adjustor who visually checks the screen where the laser beams are projected. Because of this, the adjustment heavily depends on the skill of the adjustor and precise adjustment of laser deviation over the whole image-projected area may be difficult.

The present invention has been made in view of the above circumstances and has an object to provide an optical axis adjustment device, a method for adjusting optical axes and a projection-type display apparatus having a simple and compact configuration and easily correcting inclination and positional deviation of optical axes of multiple light sources to obtain excellent projected images.

Solution to Problem

In order to achieve the object, the present invention provides an optical axis adjustment device generating a signal for adjusting the angle and position of an optical axis of an incident laser beam emitted from a light source, including: reflection/branching filter that reflects and branches a part of the incident beam; position detection imaging device that has an imaging plane where the laser beam having passed through the first reflection/branching filter enters; a condenser lens that focuses the laser beam reflected by the first reflection/branching filter; and angle detection imaging device that has an imaging plane where the laser beam focused by the condenser lens enters, wherein the angle of the optical axis of the incident laser beam emitted from the light source is determined based on the position where the laser beam enters on the imaging plane of the angle detection imaging device, the position of the optical axis of the incident laser beam emitted from the light source is determined based on the position where the laser beam enters on the imaging plane of the position detection imaging device, and a signal for adjusting the angle and position of the optical axis is generated.

In addition, the present invention provides a projection-type display apparatus including the above-described optical axis adjustment device; a plurality of light sources; condenser lenses provided to the respective light sources; actuators that make a single-axis adjustment or multiple-axis adjustment to pairs of the condenser lens and the light source; a plurality of combining filters that combine laser beams from the plurality of light sources via the condenser lenses; and a two-dimensional scan mirror that reflects the plurality of combined laser beams at any angle, wherein the plurality of light sources modulate laser beams according to an image signal and supply the modulated laser beams, the modulated laser beams are converted by the condenser lenses into collimated light beams or approximately collimated light beams, the collimated light beams are combined on the same optical axis by the combining filters that combine the plurality of laser beams, the light beams from the plurality of light sources are reflected by the two-dimensional scan mirror to impinge onto a screen, the combined laser beams enter the optical axis adjustment device, and the optical axis adjustment device generates a signal for adjusting the angle and position of the optical axis to drive the actuators.

Furthermore, the present invention provides a method for adjusting an optical axis in the projection-type display apparatus, including: selecting any one of a plurality of light sources as a reference light source, measuring the angle and position of a laser beam that is emitted from the reference light source and enters the angle detection imaging device and the position detection imaging device, and defining the measured angle and position as a reference angle and a reference position, respectively; and emitting light beams, in order, from light sources other than the reference light source, measuring the angle and position of the laser beams having entered the angle detection imaging device and the position detection imaging device, and adjusting the angle and position of the light sources so as to coincide with the reference angle and position.

BRIEF DESCRIPTION OF THE DRAWINGS

FIG. 4 illustrates a basic configuration of the projection-type display apparatus according to the third embodiment of the present invention.

FIG. 6 illustrates a basic configuration of the projection-type display apparatus according to the sixth embodiment of the present invention.

DESCRIPTION OF EMBODIMENTS

Embodiments of an optical axis adjustment device, a method for adjusting optical axes and a projection-type display apparatus according to the present invention will be described in detail with the drawings.

[Embodiment 1]

Figure 1:
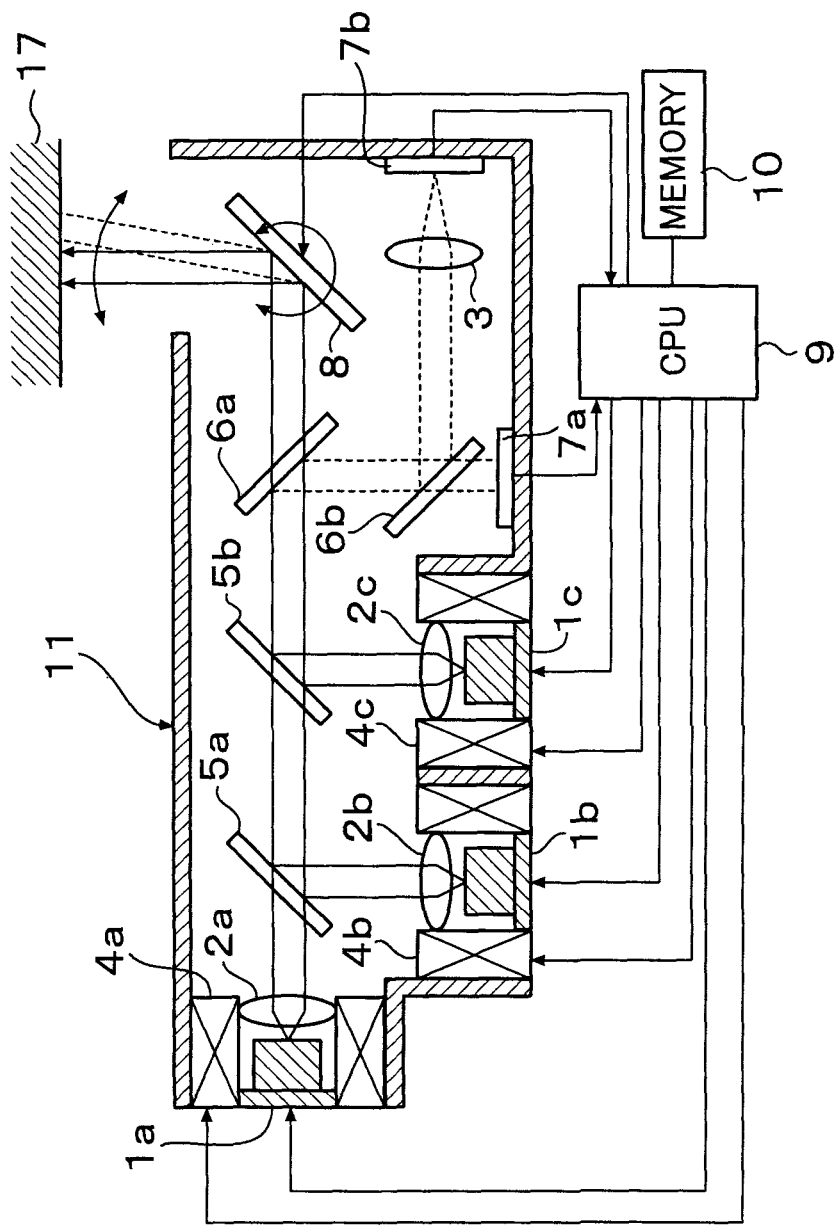
FIG. 1 illustrates a basic configuration of the projection-type display apparatus according to the first embodiment of the present invention.

FIG. 1 illustrates a basic configuration of the projection-type display apparatus according to the first embodiment of the present invention. In FIGS. 1, 1a, 1b and 1c denote respective light sources of green, blue and red semiconductor lasers or the like; 2a, 2b and 2c denote condenser lenses for the light sources 1a, 1b, 1c; 3 denotes a condenser lens; 4a, 4b and 4c denote actuators for the light sources and condenser lenses; 5a and 5b denote combining filters that combine light beams from the respective light sources; 6a and 6b denote filters that reflect and branch a part of the combined laser beam; 7a denotes position detection imaging device; 7b denotes angle detection imaging device; 8 denotes a scan mirror that reflects the combined light beam at any angle to project it as an image onto a screen 17; 9 denotes a CPU; 10 denotes a memory; and 11 denotes an optical base (case).

The projection-type display apparatus according to the first embodiment of the present invention is made up with the optical base 11 housing the light sources 1a, 1b, 1c, condenser lenses 2a, 2b, 2c for respective light sources, actuators 4a, 4b, 4c, combining filters 5a, 5b, reflection/branching filters 6a, 6b, condenser lens 3, position detection imaging device 7a, angle detection imaging device 7b, and scan mirror 8.

In the aforementioned configuration, green, blue, red laser beams from the light sources 1a, 1b, 1c are converted into approximately collimated light by the respectively provided condenser lenses 2a, 2b, 2c. The collimated light beams are then combined by the combining filters 5a, 5b, which reflect light of a specific wavelength, but allow light of other wavelengths to pass therethrough. The combined light is then reflected at any angle by the scan mirror 8, which performs a two-dimensional scan, and is projected onto an image-projected surface of the screen 17 to form a color image on the screen 17. It is needless to say that the intensity of the color light beams from the light sources 1a, 1b, 1c is modulated based on display data.

Such a projection-type display apparatus needs to align the optical axes of the multiple light sources 1a, 1b, 1c and match the position of the optical axes. In order to align the optical axes of the laser beams from the light sources 1a, 1b, 1c, the embodiment of the present invention is configured so that the filters 6a, 6b, which reflect and branch a part of the combined laser beam, and condenser lens 3 introduce the part of the combined laser beam to the position detection imaging device 7a and angle detection imaging device 7b, the CPU 9 calculates detected positional information and angle information, and the actuators 4a, 4b, 4c for the light sources and condenser lenses are controlled based on the calculation results.

Note that the aforementioned position detection imaging device 7a and angle detection imaging device 7b may be well-known devices called a quadrant detector or position sensing detector (PSD). The actuators 4a, 4b, 4c may be well-known four-axis actuators.

Figure 2:
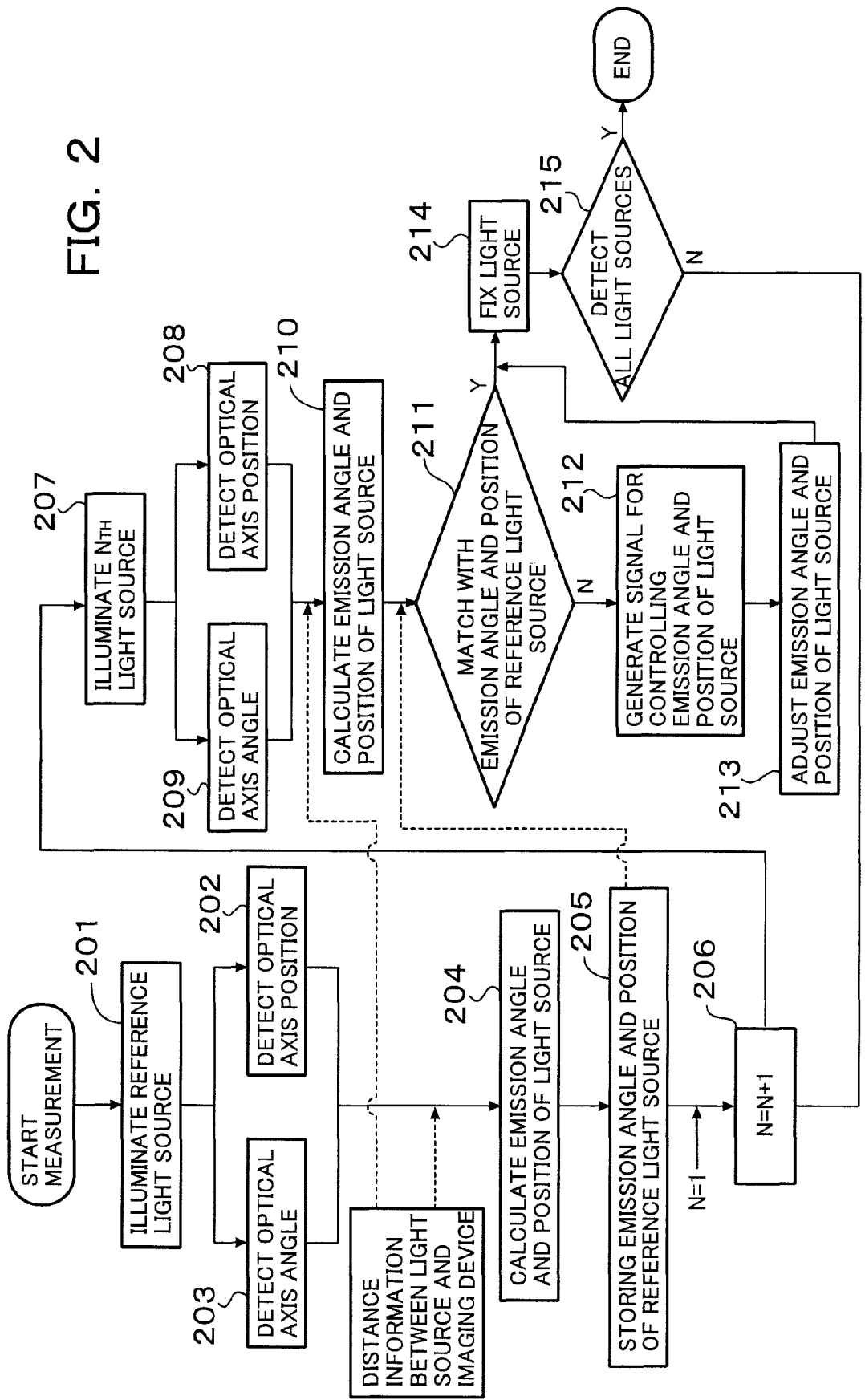
FIG. 2 is a flow chart explaining a method for adjusting optical axes of light sources 1a, 1b, 1c.

FIG. 2 is a flow chart explaining a method for adjusting the optical axes of the light sources 1a, 1b, 1c, and the method for adjusting the optical axes of the light sources according to the embodiment of the present invention will be described with reference to FIG. 2.

(1) A light source 1a is selected as a reference light source and illuminated alone. A laser beam emitted from the light source 1a is split by the reflection/branching filters 6a, 6b into two laser beams so that light passing through the filter 6b enters the imaging plane of the position detection imaging device 7a, while light reflected by the filter 6b enters the angle detection imaging device 7b through the condenser lens 3 (step 201).

(2) The position detection imaging device 7a outputs a position detection signal corresponding to the position where the laser beam impinges to send the detection signal to the CPU 9. On the other hand, the angle of the optical axis of collimated light incident to a condenser lens and the position where the light is focused by the condenser lens are generally proportional to the angle of incidence. Because of this, when the light reflected by the filter 6b is converged by the condenser lens 3, which converges the reflected and branched light, and becomes converged light that then impinges the imaging plane of the angle detection imaging device 7b, the angle detection imaging device 7b outputs an angle detection signal of the incident laser beam and sends the detection signal to the CPU 9 (steps 202 and 203).

(3) The CPU 9 calculates the light-emission angle and position of the reference light source 1a based on the position detection signal from the position detection imaging device 7a and the angle detection signal from the angle detection imaging device 7b. Specifically, the CPU 9 calculates the reference angle (light-emission angle of light source) of the optical axis of the light beam emitted from the light source 1a from the angle detection signal from the angle detection imaging device 7b and the distance between the condenser lens 3 and angle detection imaging device 7b. In addition, based on the position where a light beam emitted from the light source 1a enters on the imaging plane of the position detection imaging device 7a is determined by two phenomena including the position of the optical axis of the light beam emitted from the light source and the positional displacement of the light beam caused by the inclination of the optical axis as shown by Equation (1), the CPU 9 calculates the position of the optical axis of the light beam emitted from the reference light source 1a by Equation (1) with the reference angle of the optical axis and the optical axis position on the imaging plane, which are measured in the aforementioned process, and the distance between the light source and the imaging plane of the position detection imaging device 7a (step 204).

Optical axis position on the imaging plane=optical axis position at light source+(distance between light source and imaging plane)×tan (optical axis angle)  Equation (1)

(4) The CPU 9 stores the information about the calculated emission angle and position of the reference light source 1a in the memory 10 (step 205).

(5) Out of N number of light sources, except for the light source 1a as a reference light source, a light source 1b, which is a N=1th light source, is selected and the inclination and position of the optical axis of the light beam emitted from the light source 1b are detected through the above-described same measurement method used for the light source 1a. Then, the angle and position of the optical axis at the light source 1b are calculated by the CPU 9 based on the inclination and position (steps 206 to 210).

(6) The CPU 9 determines whether the reference angle and position obtained through the measurement and calculation performed on the light source 1a match the angle and position obtained through the measurement and calculation performed on the light source 1b. If a mismatch occurs, an adjustment signal is generated from the deviation and sent to the actuator 4b to control the angle and position of the optical axis of the laser beam emitted from the light source 1b. The actuator 4b makes an adjustment so that the deviation between the angle and position of the optical axis of the laser beam emitted from the light source 1b and the reference angle and position of the light source 1a becomes zero (steps 211 to 213).

(7) After the angle and position adjustment process in step 213 is completed, or if the angle and position of the light source 1a match those of the light source 1b in step 211, the light source 1b is fixed. Subsequently, it is determined if all the light sources have been subjected to the process. If it is so, the adjustment process of the optical axes is terminated (steps 214, 215).

(8) If it is found that there are still unprocessed light sources in step 215, the process returns to step 206, and the next light source, i.e., a light source 1c, is selected and subjected to the same process.

The fixation of the light sources in the above-described process can be done by providing, for example, holding means, as shown in FIG. 11, capable of fixing the light source.

In the above description, the light source 1a is selected as a reference light source; however, the reference light source is not limited to the light source 1a, but can be either the light source 1b or 1c. The first embodiment of the present invention can combine the light beams from the light sources 1a, 1b, 1c with the position and angle of the optical axes thereof perfectly matched with each other through the above-described series of adjustment steps. As a result, even if the combined laser beam scanned by the mirror 8 is irradiated on the screen 17 at any distance, the respective light beams emitted from the light sources 1a, 1b, 1c are perfectly combined.

The actuators 4a, 4b, 4c are provided to pairs of the light sources 1a, 1b, 1c and condenser lens 2a, 2b, 2c, respectively, in the first embodiment of the present invention described with FIGS. 1 and 2; however, as apparent from the description with FIG. 2, the adjustment process of optical axes does not need the actuator for controlling the pair of reference light source and condenser lens, and therefore predetermining a reference light source can omit an actuator for the light source.

[Embodiment 2]

Figure 3:
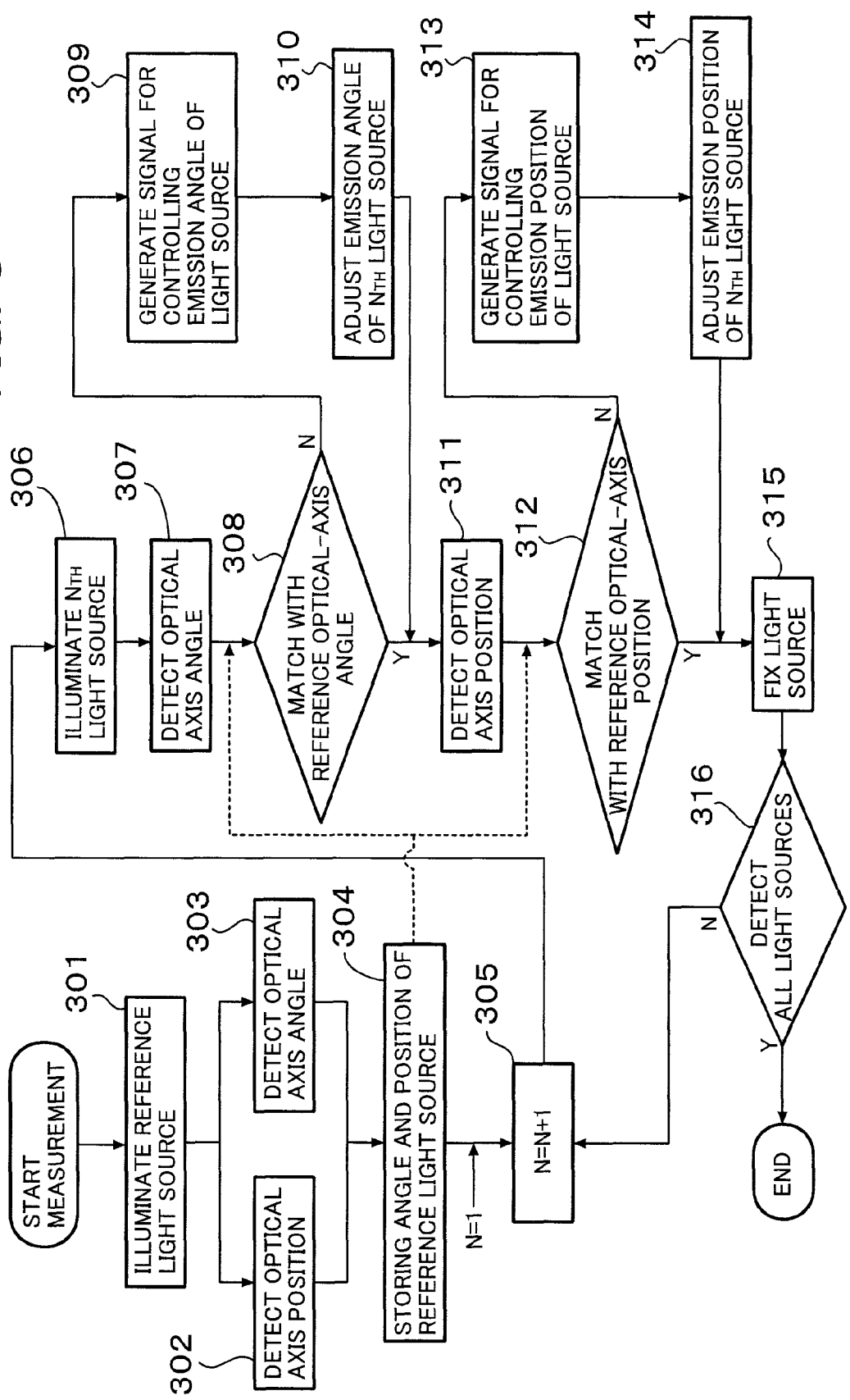
FIG. 3 is a flow chart explaining a method for adjusting the optical axes of the light sources 1a, 1b, 1c according to the second embodiment of the present invention.

FIG. 3 is a flow chart explaining the method for adjusting the optical axes of the light sources 1a, 1b, 1c according to the second embodiment of the present invention, and the method will be now described. The method for adjusting the optical axes in the second embodiment includes optical-axis adjustment steps different from the first embodiment, but can be implemented by a display apparatus having the same basic configuration as that of FIG. 1.

(1) As with the case of the first embodiment, a light source 1a is selected as a reference light source and illuminated alone. A laser beam emitted from the light source 1a is split by the reflection/branching filters 6a, 6b into two laser beams so that light passing through the filter 6b enters the imaging plane of the position detection imaging device 7a, while light reflected by the filter 6b enters the angle detection imaging device 7b through the condenser lens 3 (step 301).

(2) The CPU 9 calculates a reference optical-axis angle of the light beam emitted from the light source 1a with an angle detection signal output based on the incident position on the imaging plane of the angle detection imaging device 7b and stores the reference optical-axis angle in the memory 10. On the other hand, the CPU 9 calculates an optical axis position on the imaging plane of the position detection imaging device with the signal output based on the incident position on the imaging plane of the position detection imaging device 7a and stores the optical axis position in the memory 10 (steps 302 to 304).

(3) Out of N number of light sources, except for the light source 1a as a reference light source, a light source 1b, which is a N=1th light source, is selected and illuminated alone. The CPU 9 evaluates the inclination of the laser beam emitted from the light source 1b to calculate the optical axis angle of the light source 1b from the signal detected by the angle detection imaging device 7b (steps 305 to 307) in the same measurement method as that for the light source 1a.

(4) The CPU 9 determines whether the reference angle obtained through the measurement and calculation performed on the light source 1a matches the angle obtained through the measurement and calculation performed on the light source 1b. If a mismatch occurs, an adjustment signal is generated from the deviation and sent to the actuator 4b to control the optical axis angle of the laser beam emitted from the light source 1b. The actuator 4b makes an adjustment so that the deviation between the optical axis angle of the laser beam emitted from the light source 1b and the reference angle of the light source 1a becomes zero (steps 308 to 310).

(5) After the angle adjustment process in step 310 is completed, or if the angle of the light source 1a matches the angle of the light source 1b in step 308, the optical axis position of the laser beam emitted from the light source 1b at the imaging plane of the position detection imaging device 7a is measured in the same measurement method as that used for the light source 1a. The CPU 9 calculates the optical axis position of the light source 1b from the measurement results (step 311).

(6) The CPU 9 determines whether the reference optical axis position obtained through the measurement and calculation performed on the light source 1a matches the optical axis position obtained through the measurement and calculation performed on the light source 1b. If a mismatch occurs, an adjustment signal is generated from the deviation and sent to the actuator 4b to control the optical axis position of the laser beam emitted from the light source 1b. The actuator 4b makes an adjustment so that the deviation between the optical axis position of the laser beam emitted from the light source 1b and the reference optical axis position of the light source 1a becomes zero (steps 312 to 314).

(7) After the optical axis position adjustment process in step 314 is completed, or if the optical axis position of the light source 1a matches the optical axis position of the light source 1b in step 312, the light source 1b is fixed in the adjusted state. Subsequently, it is determined if all the light sources have been subjected to the process. If all the light sources have been processed, the adjustment process of the optical axis is terminated (steps 315, 316).

(8) If it is found that there are still unprocessed light sources in step 316, the process returns to step 305, and the next light source, i.e., a light source 1c, is selected and subjected to the same process.

In the above description, the light source 1a is selected as a reference light source; however, the reference light source is not limited to the light source 1a, but can be either the light source 1b or 1c. The above-described second embodiment of the present invention can combine the light beams from the light sources 1a, 1b, 1c with the position and angle of the optical axes thereof perfectly matched with each other through the above-described series of adjustment steps. As a result, even if the combined laser beam scanned by the mirror 8 is irradiated on the screen 17 at any distance, the respective light beams emitted from the light sources 1a, 1b, 1c are perfectly combined.

The above-described second embodiment of the present invention can be implemented even if the distances between the respective light sources 1a, 1b, 1c and the imaging plane of the position detection imaging device 7a are not known. In addition, as with the case of the first embodiment, predetermining a reference light source can omit an actuator for the light source in the above-described second embodiment.

[Embodiment 3]

Figure 5:
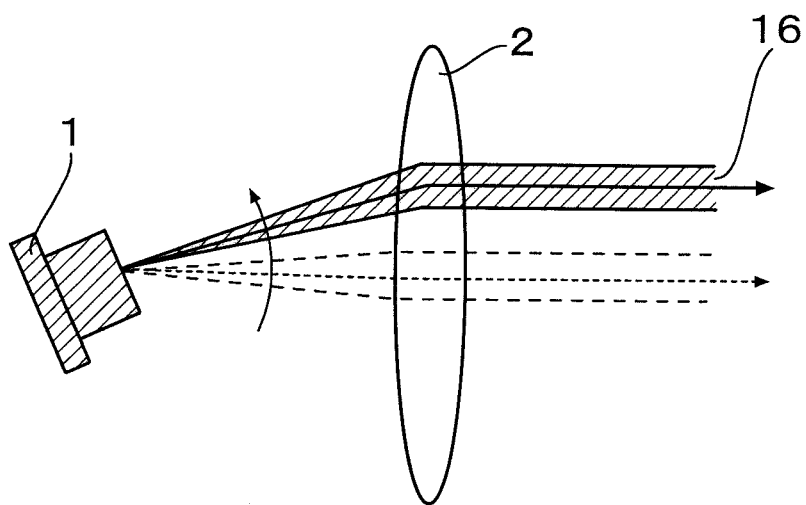
FIG. 5 illustrates the inclination of a light source placed at a focal position of a condenser lens and positional variations of the optical axis of the laser beam emitted from the condenser lens 2.

FIG. 4 illustrates a basic configuration of the projection-type display apparatus according to the third embodiment of the present invention. FIG. 5 illustrates the inclination of a light source 1 placed at a focal position of the condenser lens 2 and the positional variations of the optical axis 16 of a laser beam emitted from the condenser lens 2. The third embodiment of the present invention shown in FIG. 4 is principally the same in configuration as the first and second embodiments of the present invention shown in FIG. 1 and implementable in the same method for adjusting optical axes.

The third embodiment of the present invention is different from the first embodiment of the present invention in FIG. 1 in that the third embodiment includes different actuators for adjusting the optical axes of the light sources 1a, 1b, 1c in a different method for adjusting the actuators. The following description is the differences of the third embodiment of the present invention from the first and second embodiments.

The configuration of the fourth embodiment of the present invention in FIG. 4 can be achieved by providing angle adjustment actuators 4d, 4e, 4f for the light sources 1a, 1b, 1c and position adjustment actuators 4g, 4h, 4i for the condenser lens 2a, 2b, 2c rather than providing optical axis adjustment actuators controlling both the position and angle of the optical axes of the laser beams emitted from the light sources 1a, 1b, 1c. The optical axis angles of the laser beams emitted from the light sources 1a, 1b, 1c are controlled by translating the adjustment actuators 4g, 4h, 4i for the condenser lens 2a, 2b, 2c in two axial directions perpendicular to each other on a normal plane to the light-travelling direction.

As shown in FIG. 5, the inclination of the light source 1 placed at the focal position of the condenser lens 2 influences the position of the optical axis 16 of the laser beam emitted from the condenser lens 2. In order to control the optical axis position of the laser beams emitted from the light sources, the angle adjustment actuators 4d, 4e, 4f for the light sources 1a, 1b, 1c rotate the light sources about two axes perpendicular to each other on a normal plane to the travelling direction of the light beams with respect to light emitting ends of the light sources.

According to the third embodiment of the present invention, the actuators for the light sources 1a, 1b, 1c and actuators for the condenser lenses 2a, 2b, 2c are separately prepared to control the angle and position of the optical axes of emitted laser light, thereby reducing the number of axes each actuator can move (two axes) and therefore making the respective actuators smaller in size.

[Embodiment 4]

The fourth embodiment of the present invention, which is not shown in the drawings, has the same configuration as that of the third embodiment of the present invention shown in FIG. 4, but does not include the actuators 4g, 4h, 4i for adjusting the condenser lenses 2a, 2b, 2c.

In order to control the position and angle of the optical axes of the laser beams emitted from the light sources 1a, 1b, 1c, the fourth embodiment of the present invention is configured to control the position and angle of the light sources 1a, 1b, 1c by optical-axis adjustment actuators 4d, 4e, 4f provided to the light sources 1a, 1b, 1c, respectively.

More specifically, translating the light sources 1a, 1b, 1c in the two axial directions perpendicular to each other on the normal plane to the traveling direction of the light beams can control the angle of the optical axes of the light beams. For example, a displacement of the light source 1a in the Y-direction inclines the light beam in the Y-axis direction, while a displacement of the light source 1a in the Z-direction inclines the optical axis of the light beam in the Y-axis direction. On the other hand, when the light sources 1a, 1b, 1c are rotated about the two axes perpendicular to each other on the normal plane to the traveling direction of the light beams with respect to a light emitting point, the rotation in the rotating directions can control the position of the optical axes. For example, rotation of the light source 1a in the β-direction displaces the optical axis position in the Z-axis direction, while rotation of the light source 1a in the Y-direction displaces the optical axis position in the Y-axis direction.

[Embodiment 5]

The fifth embodiment of the present invention, which is not shown in the drawings, has the same configuration as that of the third embodiment of the present invention shown in FIG.

4, but does not include the actuators 4d, 4e, 4f for adjusting the light sources 1a, 1b, 1c. In order to control the optical axis angles of the laser beams emitted from the light sources 1a, 1b, 1c, the fifth embodiment of the present invention is configured to control the optical axis angles of the laser beams emitted from the light sources 1a, 1b, 1c by the adjustment actuators 4g, 4h, 4i provided to the condenser lenses 2a, 2b, 2c.

According to the fifth embodiment of the present invention, the light sources 1a, 1b, 1c, which produce heat, do not need to be fixed by the poor heat-conductive actuators, thereby improving heat dissipation of the light sources 1a, 1b, 1c.

[Embodiment 6]

FIG. 6 illustrates a basic configuration of the projection-type display apparatus according to the sixth embodiment of the present invention. The sixth embodiment of the present invention shown in FIG. 6 is principally the same in configuration as the first and second embodiments of the present invention in FIG. 1 and implementable in the same method for adjusting optical axes.

The sixth embodiment of the present invention is different from the first embodiment of the present invention described with FIG. 1 in that the scan mirror 8 allows a part of light beams to pass therethrough and a filter 6a for reflecting/branching laser beams is located in a rearward position of the mirror 8 so that the filter 6a reflects and branches laser light having passed through the mirror 8 that reflects combined laser light at any angle. The sixth embodiment of the present invention can be implemented without the reflection/branching filter 6b, which is required in the first to third embodiments, thereby making the optical system configuration simpler.

[Embodiment 7]

Figure 7:
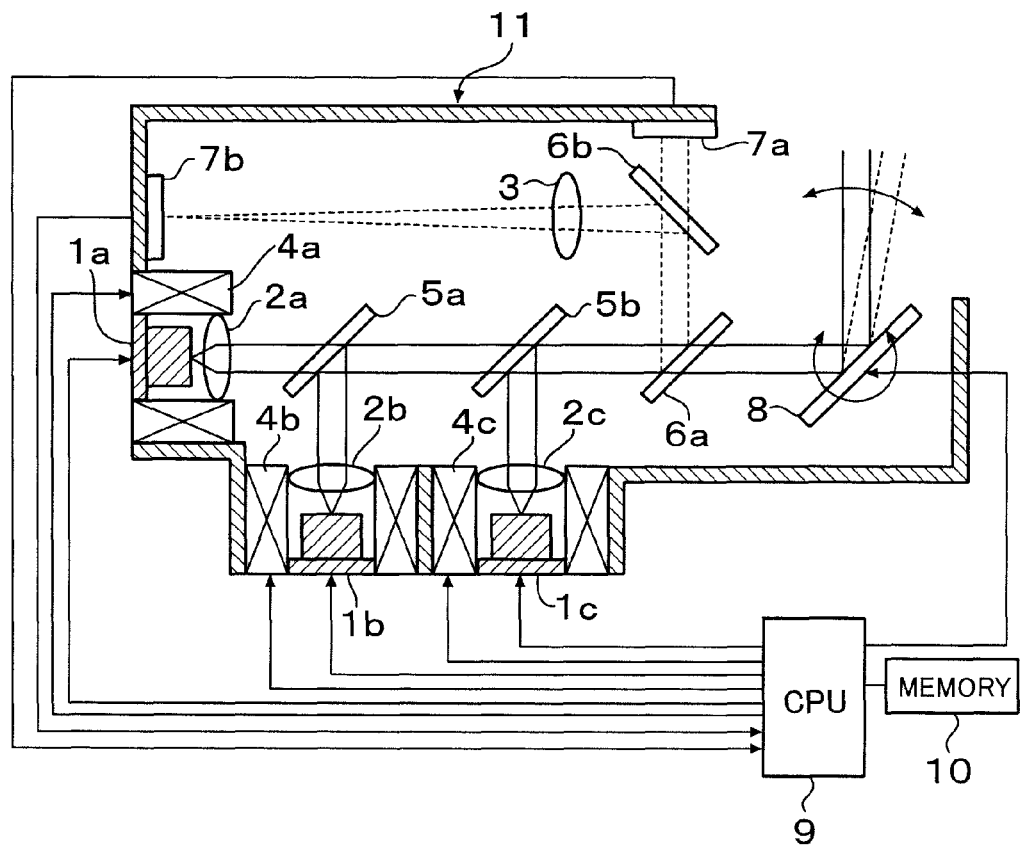
FIG. 7 illustrates a basic configuration of the projection-type display apparatus according to the seventh embodiment of the present invention.

FIG. 7 illustrates a basic configuration of the projection-type display apparatus according to the seventh embodiment of the present invention. The seventh embodiment of the present invention in FIG. 7 is principally the same in configuration as the first and second embodiments of the present invention shown in FIG. 1 and implementable in the same method for adjusting optical axes.

The seventh embodiment of the present invention is different from the first embodiment of the present invention described with FIG. 1 in that: a filter 6a for reflecting/branching laser beams is rotated 90 degrees with respect to the filter 6a shown in FIG. 1; the branched laser beam is introduced to a filter 6b for reflecting/branching laser beams located above the filter 6a and position detection imaging device 7a provided on the upper surface of the optical base, while being reflected by the filter 6b for reflecting/branching laser beams in the opposite direction to the travelling direction of the combined laser beam; and a condenser lens 3 and angle detection imaging device 7b are arranged in the opposite direction to the travelling direction of the combined laser beam.

According to the seventh embodiment of the present invention, the angle detection imaging device 7b is arranged in the direction from which laser light comes beyond many optical elements, such as the light sources, condenser lenses associated with the light sources, actuators and combining filters, arranged on the light incident side of the filter 6a for reflecting/branching the combined light beam, thereby making the distance between the condenser lens 3 for focusing the laser beams and the angle detection imaging device 7b longer. Consequently, even if the display apparatus is small, the sensitivity to angle changes corresponding to the inclination of the laser beam emitted from each of the light sources 1a, 1b, 1c can be improved.

[Embodiment 8]

Figure 8:
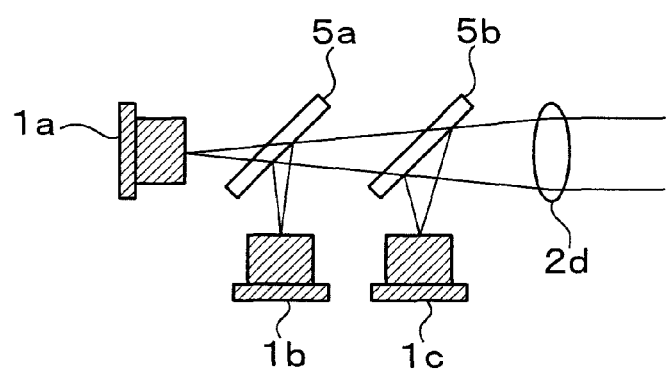
FIG. 8 illustrates a basic configuration of the projection-type display apparatus according to the eighth embodiment of the present invention.

FIG. 8 illustrates a basic configuration of the projection-type display apparatus according to the eighth embodiment of the present invention.

The eighth embodiment of the present invention shown in FIG. 8 includes an optical system for combining laser beams, as shown in the first embodiment of the present invention described with FIG. 1, having light sources 1a, 1b, 1c, condenser lenses 2a, 2b, 2c for respective light sources and combining filters 5a, 5b and is configured, rather than converting laser beams from the multiple light sources 1a, 1b, 1c into collimated light or approximately collimated light by the condenser lenses 2a, 2b, 2c, respectively, as is done in the first embodiment, so to combine diffused laser beams emitted from the light sources 1a, 1b, 1c by the combining filters 5a, 5b and then convert the combined beams by a condenser lens 2d into collimated light or approximately collimated light. In this case, actuators are provided only to the light sources.

According to the eighth embodiment of the present invention, the number of the condenser lenses provided to each of the multiple light sources can be reduced to one, thereby downsizing the apparatus. In addition, the sensitivity to the optical axis displacement caused by relative displacement of the light sources and condenser lenses can be reduced.

[Embodiment 9]

Figure 9:
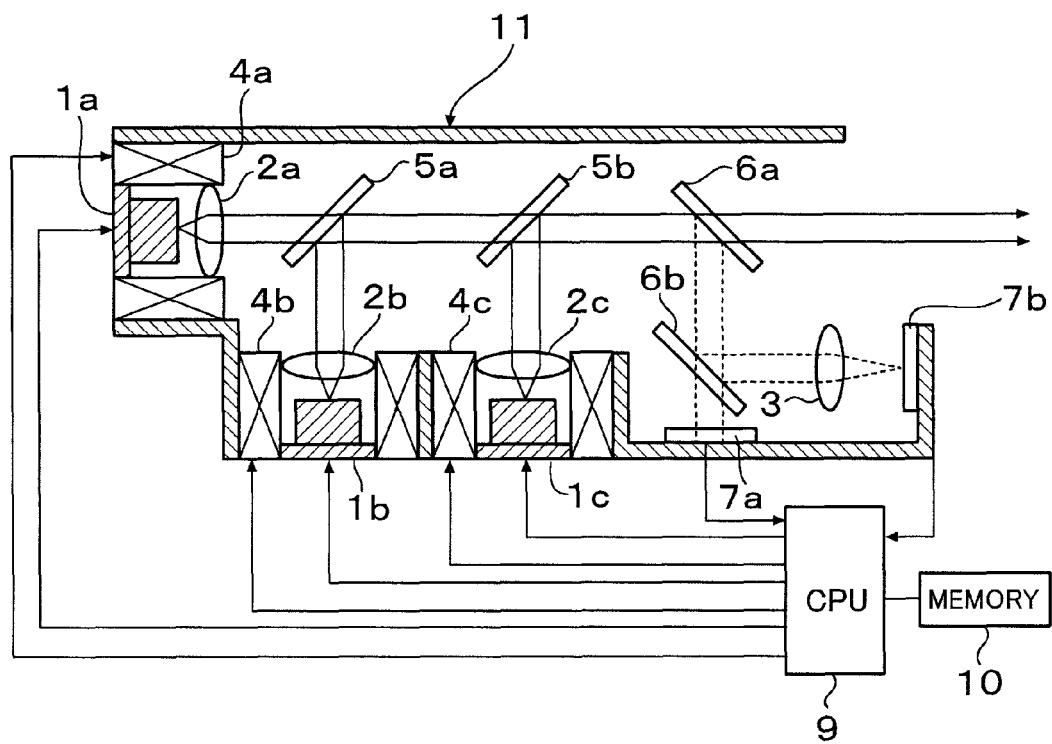
FIG. 9 illustrates light sources for the projection-type display apparatus according to the ninth embodiment of the present invention.

FIG. 9 illustrates light sources for the projection-type display apparatus according to the ninth embodiment of the present invention.

The projection-type display apparatus according to the ninth embodiment of the present invention is the same as the projection-type display apparatus according to the first embodiment described with FIG. 1, but does not include the scan mirror 8 that reflects combined laser beams at any angle. The ninth embodiment of the present invention can be used as light sources for a projection-type display apparatus allowing laser beams emitted from the light sources 1a, 1b, 1c to highly accurately align with each other and can be provided as a product to brand manufacturers or the like. The brand manufacturers or the like can manufacture and sell display apparatuses with the light sources, a scan mirror and screen assembled therein.

[Embodiment 10]

Figure 10:
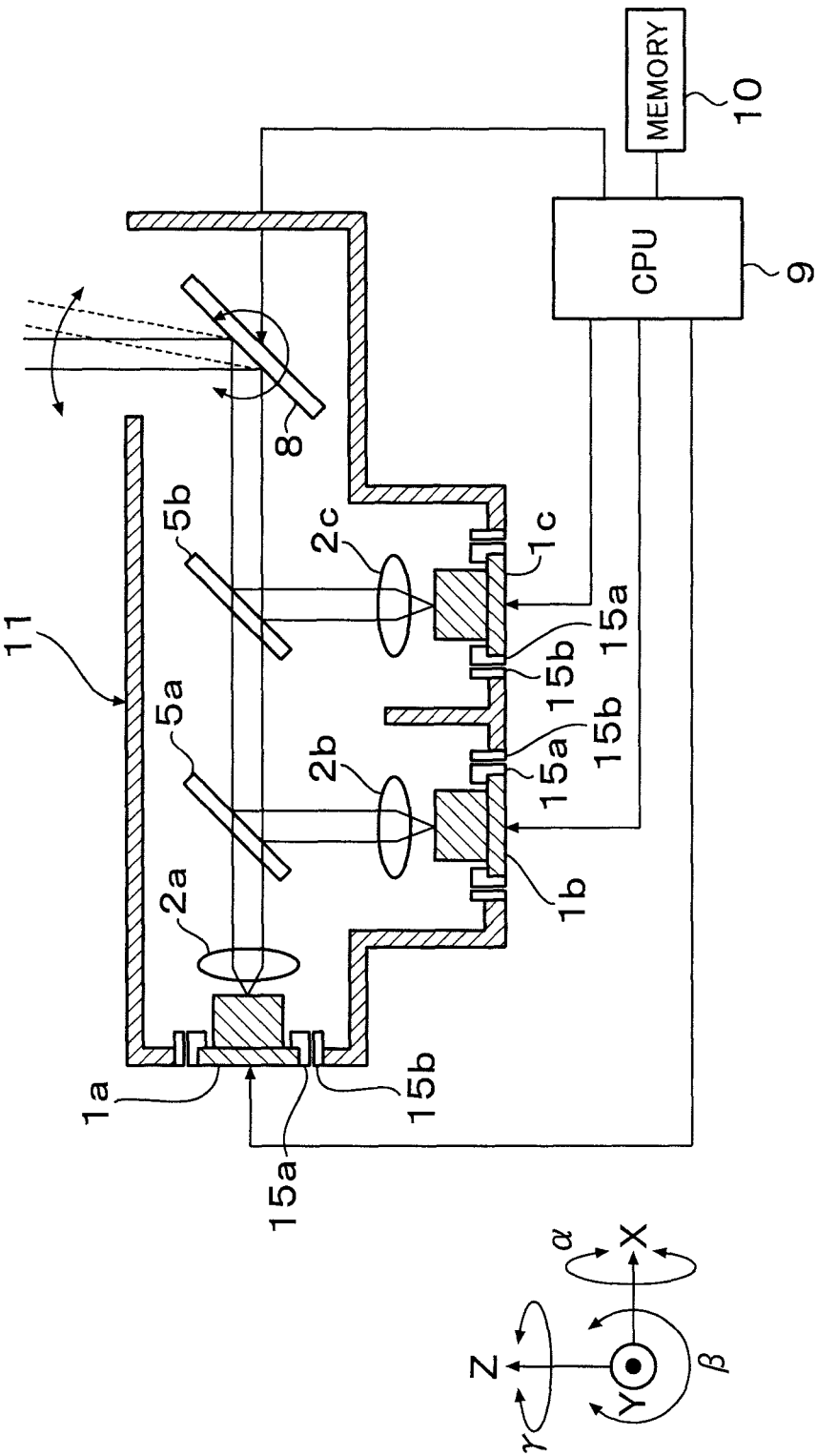
FIG. 10 illustrates a basic configuration of the projection-type display apparatus according to the tenth embodiment of the present invention.
Figure 11A:
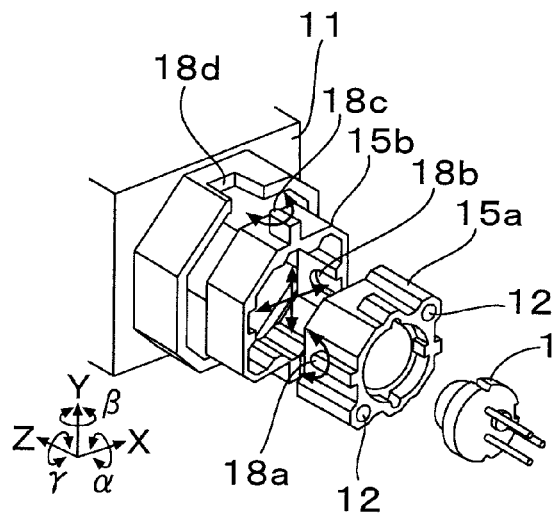
FIG. 11 illustrates an exemplary configuration of an external adjustment mechanism.
Figure 11B:
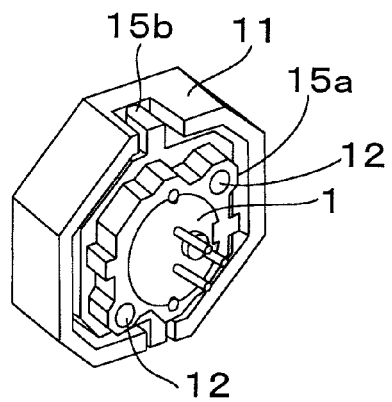
Figure 11C:
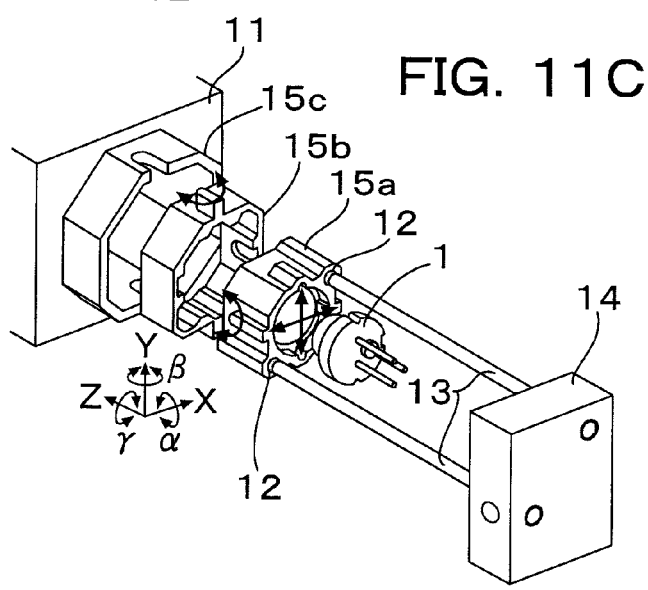

FIG. 10 illustrates a basic configuration of the projection-type display apparatus according to the tenth embodiment of the present invention, while FIG. 11 illustrates exemplary configurations of an external adjustment mechanism used instead of the actuator. FIGS. 11(a), 11(b) and 11(c) are an exploded perspective diagram, an assembly diagram and a diagram showing how to assemble the external adjustment mechanism, respectively.

The tenth embodiment of the present invention shown in FIG. 10 makes an adjustment of optical axes using an external adjustment mechanism, which will be described with FIG. 11, instead of the optical-axis adjustment actuators provided to the light sources and condenser lenses in the projection-type display apparatus according to the first embodiment of the present invention shown in FIG. 1. The basic configuration of the apparatus and the method for adjusting the optical axes of the tenth embodiment are the same as those in FIG. 1. For simplicity, filters 6a, 6b, which reflect/branch a part of a combined laser beam, position detection imaging device 7a, angle detection imaging device 7b and a condenser lens 3 are not depicted in FIG. 10, but of course are provided in the apparatus according to the tenth embodiment. The tenth embodiment of the present invention is designed to adjust the optical axes with holders 15a, 15b shown in FIGS. 11(a) and 11(b) and external adjustment parts 13, 14 as shown in FIG. 11(c).

This adjustment mechanism includes a pivot structure 18a formed in a holder 15a with a light source 1 attached thereto and a pivot receiving structure 18b formed in a holder 15b and is configured to pivot about the X axis on a plane normal to the travelling direction of the laser beam with respect to an emission point, thereby adjusting the angle in the a direction of the optical axis emitted from the light source 1. In addition, this adjustment mechanism includes a pivot structure 18c formed in a holder 15b and a rectangular groove structure 18d formed on the optical base (case) 11 and is configured to pivot about the Y axis on a plane normal to the travelling direction of the light beam with respect to an emission point, thereby adjusting the optical axis of the light beam emitted from the light source 1 in the β direction. Furthermore, sliding the pivot structure 18c in the groove structure 18d adjusts the position in the X and Y-directions, two axes perpendicular to each other normal to the travelling direction of the laser beam, and subsequently the holders, light sources and optical base are fixed with an adhesive or the like.

The holder 15a is formed with two circular holes 12 for adjusting an optical axis. The circular holes 12 support the holders 15a, 15b and receive two pins 13 for adjusting the optical axis of the light source 1 as shown in FIG. 11(c).

Figure 12A:
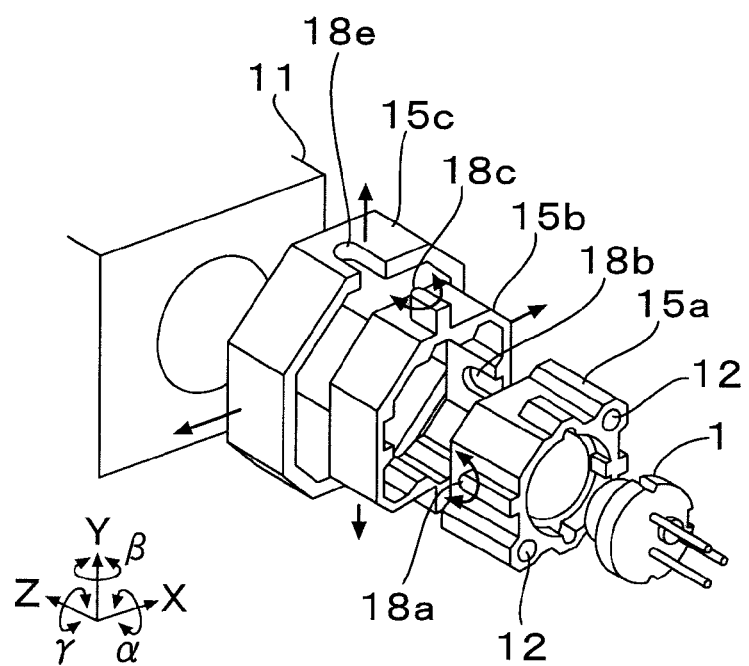
FIG. 12 illustrates another exemplary configuration of the external adjustment mechanism.
Figure 12B:
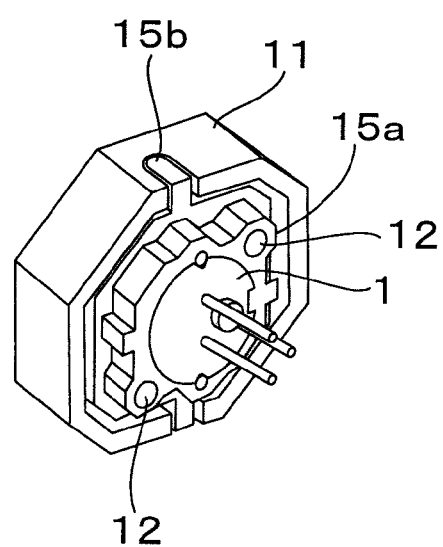

FIG. 12 illustrates another exemplary configuration of the external adjustment mechanism as a substitute for actuators. FIGS. 12(a) and 12(b) are an exploded perspective diagram and assembly diagram, respectively. The external adjustment mechanism shown in FIG. 12 is applied to the projection-type display apparatus according to the tenth embodiment of the present invention described with FIG. 10.

The external adjustment mechanism shown in FIG. 12 includes a holder as described in FIG. 11, but the holder is composed of three parts, a holder 15a, holder 15b and holder 15c. The holder 15a with a light source 1 attached thereto has a pivot structure 18a, while the holder 15b has a pivot receiving structure 18b. The external adjustment mechanism is configured to pivot about the X axis on a plane normal to the travelling direction of the laser beam with respect to an emission point, thereby adjusting the angle of the optical axis of the light emitted from the light source 1 in the a direction. In addition, the external adjustment mechanism shown in FIG. 12 includes the holder 15b having a pivot structure 18c and the holder 15c having a pivot receiving structure 18e and pivots about the Y axis on a plane normal to the travelling direction of the laser beam with respect to the emission point, thereby adjusting the angle in the β direction of the laser beam emitted from the light source 1. In addition, the holder 15c slidable on the optical base 11 in the external adjustment mechanism provided in the external adjustment mechanism in FIG. 12 adjust the position in the X, Y-direction, two axes perpendicular to each other normal to the travelling direction of the laser beam, and subsequently the holder, light source and optical base are fixed with an adhesive or the like.

[Embodiment 11]

Figure 13:
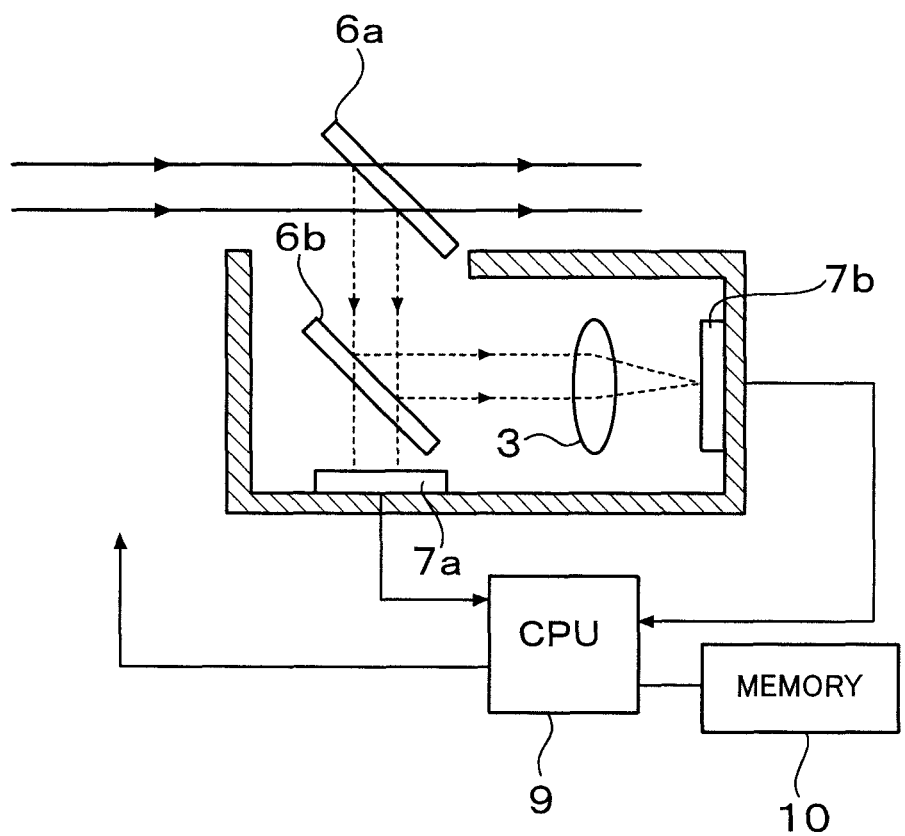
FIG. 13 illustrates an optical-axis measurement mechanism for the projection-type display apparatus according to the eleventh embodiment of the present invention.

FIG. 13 illustrates an optical-axis measurement mechanism for a projection-type display apparatus as the eleventh embodiment of the present invention.

The eleventh embodiment of the present invention directs to an optical-axis measurement mechanism extracted from the projection-type display apparatus according to the first embodiment of the present invention in FIG. 1, and includes filters 6a, 6b reflecting/branching laser beams, a lens 3 focusing the laser beams, imaging devices 7a, 7b measuring the optical axis position of the laser beams, a CPU 9 and a memory 10.

A laser beam converged by the condenser lens 3 is incident upon an imaging plane of the angle detection imaging device 7b. The depicted optical-axis measurement mechanism determines the optical axis angle of the incident light beam based on the position where the incident light beam enters on the imaging plane and determines the optical axis angle of the incident light based on the position where a reflected/branched collimated light beam enters on an imaging plane of the position detection imaging device 7a and the position where the light beam enters on the imaging plane of the angle detection imaging device 7b. Subsequently the optical-axis measurement mechanism causes the CPU 9 to make calculations to generate a signal for adjusting the angle and position of the laser beam from the inclination and position of the optical axis of the incident light.

The optical-axis measurement mechanism according to the eleventh embodiment of the present invention can be supplied to brand manufacturers or the like as a product, and the brand manufacturers or the like can install the necessary optical system in a display apparatus with a light source, scan mirror, screen and so on and sell the display apparatus as a product.

Reference Signs List 1, 1a, 1b, 1c light source
2, 2a, 2b, 2c, 2d condenser lens
3 condenser lens
4a, 4b, 4c, 4d, 4e, 4f, 4g, 4h, 4i actuator
5a, 5b combining filter
6a, 6b reflection/branching filter
7a, 7b imaging element
8 angle-variable reflecting mirror
9 CPU
10 memory
11 optical base (case)
17 screen

The invention claimed is:

1. A projection-type display apparatus comprising:
an optical axis adjustment device including:
  a first reflection/branching filter that reflects and branches a part of the incident beam;
  position detection imaging device that has an imaging plane where the laser beam having passed through the first reflection/branching filter enters;
  a condenser lens that focuses the laser beam reflected by the first reflection/branching filter; and
  angle detection imaging device that has an imaging plane where the laser beam focused by the condenser lens enters,
  wherein the angle of the optical axis of the incident laser beam emitted from the light source is determined based on the position where the laser beam enters on the imaging plane of the angle detection imaging device; the position of the optical axis of the incident laser beam emitted from the light source is determined based on the position where the laser beam enters on the imaging plane of the position detection imaging device; and a signal for adjusting the angle and position of the optical axis is generated;
a plurality of light sources;
condenser lenses provided to the respective light sources;
actuators that make a single-axis adjustment or multiple-axis adjustment to pairs of the condenser lens and the light source;
a plurality of combining filters that combine laser beams from the plurality of light sources via the condenser lenses; and
a two-dimensional scan mirror that reflects the plurality of combined laser beams at any angle, wherein: the plurality of light sources modulate laser beams according to an image signal and supply the modulated laser beams;

the modulated laser beams are converted by the condenser lenses into collimated light beams or approximately collimated light beams;

the collimated light beams are combined on the same optical axis by the combining filters that combine the plurality of laser beams;

the light beams from the plurality of light sources are reflected by the two-dimensional scan mirror to impinge onto a screen;

the combined laser beams enter the optical axis adjustment device; and the optical axis adjustment device generates a signal for adjusting the angle and position of the optical axis to drive the actuators.

2. A method for adjusting an optical axis in the projection-type display apparatus according to claim 1, comprising:

selecting any one of a plurality of light sources as a reference light source, measuring the angle and position of a laser beam that is emitted from the reference light source and enters the angle detection imaging device and the position detection imaging device, and defining the measured angle and position as a reference angle and a reference position, respectively;

emitting laser beams, in order, from light sources other than the reference light source, measuring the angle and position of the laser beams having entered the angle detection imaging device and the position detection imaging device; and adjusting the angle and position of the light sources so as to match the reference angle and position.

3. The projection-type display apparatus according to claim 1, wherein the actuator includes a lens driving actuator and a light-source driving actuator, the lens driving actuator drives a condenser lens in parallel along one axis or a plurality of axes among an axis extending in a travelling direction of the laser beam emitted from the light source and axes extending in two axial directions perpendicular to each other on a normal plane to the travelling direction, and the light-source driving actuator rotatably drives the light source with respect to an emission end as the center of rotation about one axis or a plurality of axes among an axis extending in a travelling direction of the laser beam emitted from the light source and axes extending in two axial directions perpendicular to each other on a normal plane to the travelling direction, to adjust the optical axis.

4. The projection-type display apparatus according to claim 1, wherein the light sources and the condenser lenses converting diffused light emitted from the light sources into collimated light or approximately collimated light are fixed to adjust the optical axes as an integral whole.

5. The projection-type display apparatus according to claim 1, wherein the actuator is a lens driving actuator, and the lens driving actuator drives the condenser lens in parallel along one axis or a plurality of axes among an axis extending in a travelling direction of the laser beam emitted from the light source and axes extending in two axial directions perpendicular to each other on a normal plane to the travelling direction to adjust the optical axis.

6. The projection-type display apparatus according to claim 1, wherein the actuator is a light-source driving actuator, and the light-source driving actuator drives the light source in parallel along one axis or a plurality of axes among an axis extending in a travelling direction of the laser beam emitted from the light source and axes extending in two axial directions perpendicular to each other on a normal plane to the travelling direction or rotatably drives the light source with respect to an emission end as the center of rotation about one axis or a plurality of axes among an axis extending in a travelling direction of the laser beam emitted from the light source and axes extending in two axial directions perpendicular to each other on a normal plane to the travelling direction to adjust the optical axis.

7. The projection-type display apparatus according to claim 1, wherein the two-dimensional scan mirror allows a part of light to pass therethrough, and the first filter for reflecting/branching the laser beam, the angle detection imaging device and the position detection imaging device are arranged in rearward positions of the two-dimensional scan mirror.

8. The projection-type display apparatus according to claim 1, wherein the angle detection imaging device is arranged at a position on which the reflected/branched laser beam is focused and the position is located in the opposite direction to the travelling direction of the combined laser beam.

9. The projection-type display apparatus according to claim 1, wherein after diffused light beams emitted from the plurality of light sources are combined by the plurality of combining filters, the combined diffused light beam is converted by the condenser lens into a collimated light beam or approximately collimated light beam.

10. The optical axis adjustment device according to claim 1, wherein the optical axis is adjusted through a series of adjustment steps including an adjustment of the angle of the light source that is made based on the position where the laser beam from the light source enters on the angle detection imaging device and an adjustment of the position of the light source that is subsequently made based on the position where the laser beam from the light source enters on the position detection imaging device.

11. The projection-type display apparatus according to claim 1, wherein the angle of the light source is adjusted based on the position where the laser beam enters on the angle detection imaging device and the distance between the light source and the angle detection imaging device, while the position of the light source is adjusted based on the position where the laser beam enters on the position detection imaging device and the distance between the light source and the position detection imaging device.

12. The projection-type display apparatus according to any one of claims 1, 3 to 4, comprising holding means that maintains the adjusted position and angle of the light source.

13. The projection-type display apparatus according to claim 1, comprising a mechanism that adjusts the angle and position of the optical axes of laser beams emitted from the plurality of light sources by abutting holders with the plurality of light sources attached therein against an optical base and moving the holders, wherein the holder includes a plurality of holders each having a pivot structure pivoting with respect to an emission point of the light source, the optical axis is adjusted by abutting a rotational support portion of the holder against the optical base and sliding the holder, while pivoting the holders with respect to the rotational support portions of respective pivot structures.

* * * * *